US007150036B1

(12) United States Patent
Milne et al.

(10) Patent No.: US 7,150,036 B1
(45) Date of Patent: *Dec. 12, 2006

(54) METHOD OF AND PERSONAL COMPUTER FOR DISPLAYING CONTENT RECEIVED FROM A CONTENT DELIVERY SERVER USING A DISK DRIVE WHICH INCLUDES A NETWORK ADDRESS FOR THE CONTENT DELIVERY SERVER AND A SERVER-CONTACTING PROGRAM

(75) Inventors: Matthew W. Milne, Chino, CA (US); Michael K. Eneboe, San Jose, CA (US); Scott T. Hughes, Laguna Beach, CA (US); Vu V. Luu, Milpitas, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 1082 days.

This patent is subject to a terminal disclaimer.

(21) Appl. No.: 09/618,209

(22) Filed: Jul. 18, 2000

(51) Int. Cl.
*H04L 9/32* (2006.01)

(52) U.S. Cl. .............................. 726/4; 726/18; 726/21; 709/221; 709/227

(58) Field of Classification Search ................ 713/201, 713/200, 202, 502
See application file for complete search history.

(56) References Cited

U.S. PATENT DOCUMENTS

| 5,604,873 | A | * | 2/1997 | Fite et al. .................... 710/302 |
| 5,654,905 | A | * | 8/1997 | Mulholland et al. ......... 702/186 |
| 5,696,701 | A | * | 12/1997 | Burgess et al. ................ 714/25 |
| 5,875,349 | A | * | 2/1999 | Cornaby et al. ................. 710/5 |
| 5,913,040 | A | | 6/1999 | Rakavy et al. |
| 5,948,061 | A | | 9/1999 | Merriman et al. |
| 5,960,411 | A | | 9/1999 | Hartman et al. |
| 5,974,547 | A | | 10/1999 | Klimenko et al. |
| 6,005,561 | A | | 12/1999 | Hawkins et al. |
| 6,047,327 | A | | 4/2000 | Tso et al. |
| 6,058,418 | A | | 5/2000 | Kobata |
| 6,119,162 | A | * | 9/2000 | Li et al. ...................... 709/227 |
| 6,141,010 | A | | 10/2000 | Hoyle |
| 6,167,567 | A | | 12/2000 | Chiles et al. |
| 6,170,014 | B1 | * | 1/2001 | Darago et al. ............... 709/229 |
| 6,205,432 | B1 | | 3/2001 | Gabbard et al. |
| 6,216,112 | B1 | | 4/2001 | Fuller et al. |
| 6,313,732 | B1 | | 11/2001 | DeLuca et al. |
| 6,339,761 | B1 | | 1/2002 | Cottingham |
| 6,345,294 | B1 | | 2/2002 | O'Toole et al. |
| 6,353,848 | B1 | | 3/2002 | Morris |
| 6,373,498 | B1 | * | 4/2002 | Abgrall ....................... 345/619 |
| 6,393,407 | B1 | | 5/2002 | Middleton, III et al. |

(Continued)

OTHER PUBLICATIONS

Waller et al, Securing the delivery of digital content over the Internet, Oct. 2002, IEEE, pp. 239-248.*

(Continued)

*Primary Examiner*—Ayaz Sheikh
*Assistant Examiner*—Aravind K Moorthy
(74) *Attorney, Agent, or Firm*—Knobbe, Martens, Gilson & Bear

(57) ABSTRACT

A personal computer system displays digital content received from a content delivery server. The content delivery server provides the digital content as a result of being contacted by a server-contacting program stored on a disk drive in the computer and initiated by the drive firmware. The digital content can be any of a number of file types including AVI, MPEG, or MP3.

19 Claims, 9 Drawing Sheets

U.S. PATENT DOCUMENTS

| | | |
|---|---|---|
| 6,473,855 B1 | 10/2002 | Welder |
| 6,487,601 B1 | 11/2002 | Hubacher et al. |
| 6,502,194 B1 | 12/2002 | Berman et al. |
| 6,516,338 B1 | 2/2003 | Landsman et al. |
| 6,529,949 B1 | 3/2003 | Getsin et al. |
| 6,546,489 B1 * | 4/2003 | Frank et al. ............... 713/187 |
| 6,594,682 B1 | 7/2003 | Peterson et al. |
| 6,609,127 B1 * | 8/2003 | Lee et al. ................... 707/10 |
| 6,678,741 B1 * | 1/2004 | Northcutt et al. ........... 709/248 |
| 2001/0034643 A1 | 10/2001 | Acres |
| 2001/0049620 A1 | 12/2001 | Blasko |
| 2001/0049701 A1 | 12/2001 | Howerton, III et al. |
| 2002/0013167 A1 | 1/2002 | Spaur et al. |
| 2002/0016736 A1 | 2/2002 | Cannon et al. |
| 2002/0062481 A1 | 5/2002 | Slaney et al. |
| 2002/0072965 A1 | 6/2002 | Merriman et al. |

OTHER PUBLICATIONS

Heck, Mike, Kontiki Optimizes Delivery, Dec. 2003, Info World, pp. 32-33.*

Office Action from U.S. Appl. No. 09/618,765 (K35A0623), dated Oct. 22, 2003, and pending claims at that time.

Office Action from U.S. Appl. No. 09/618,766 (K35A0625), dated Sep. 20, 2004, and pending claims at that time.

Office Action from U.S. Appl. No. 09/618,766 (K35A0625), dated Feb. 4, 2004, and pending claims at that time.

Office Action from U.S. Appl. No. 09/618,766 (K35A0625), dated Aug. 13, 2003, and pending claims at that time.

Office Action from U.S. Appl. No. 09/618,767 (K35A0617), dated Oct. 27, 2003, and pending claims at that time.

Office Action from U.S. Appl. No. 09/618,767 (K35A0617), dated Jan. 4, 2005, and pending claims at that time.

* cited by examiner

METHOD OF AND PERSONAL COMPUTER FOR DISPLAYING CONTENT RECEIVED FROM A CONTENT DELIVERY SERVER USING A DISK DRIVE WHICH INCLUDES A NETWORK ADDRESS FOR THE CONTENT DELIVERY SERVER AND A SERVER-CONTACTING PROGRAM

RELATED APPLICATIONS

The present application is related to the following patent applications, which are each incorporated by reference in their entirety: U.S. patent application Ser. No. 09/585,129 titled "SYSTEM AND METHOD OF RECEIVING ADVERTISEMENT CONTENT FROM ADVERTISERS AND DISTRIBUTING THE ADVERTISING CONTENT TO A NETWORK OF PERSONAL COMPUTERS" filed May 31, 2000; U.S. patent application Ser. No. 09/618,767, titled "DISK DRIVE AND METHOD OF MANUFACTURING SAME INCLUDING A NETWORK ADDRESS AND SERVER-CONTACTING PROGRAM", filed Jul. 18, 2000; U.S. patent application Ser. No. 09/618,765, titled "COMPUTER NETWORK AND CONNECTION METHOD FOR CONNECTING A PERSONAL COMPUTER AND A CONTENT DELIVERY SYSTEM USING A DISK DRIVE WHICH INCLUDES A NETWORK ADDRESS AND SERVER-CONTACTING PROGRAM", filed Jul. 18, 2000; and U.S. patent application No. 09/618,766, titled "METHOD OF AND CONTENT DELIVERY SERVER FOR DELIVERING CONTENT TO A PERSONAL COMPUTER HAVING A DISK DRIVE WHICH INCLUDES A NETWORK ADDRESS FOR DRIVE WHICH INCLUDES A NETWORK ADDRESS FOR THE CONTENT DELIVERY SYSTEM AND A SERVER-CONTACTING PROGRAM", filed Jul. 18, 2000.

BACKGROUND OF THE INVENTION

1. Field of the Invention

The field of the invention relates to personal computers. More particularly, the field of the invention relates to a personal computer using a disk drive having a server-contacting program to receive content from a content delivery server.

2. Background Information

A content data provider is a company that creates or transmits digital content, e.g., music, games, software utility, and advertisements. To be a successful content data provider it is necessary to obtain customer awareness with respect to the company itself, as well as to the content data provider's products.

Historically, there have been a number of advertising and distribution channels to promote digital content. For example, maintaining a website, direct mailing, and renting billboards are each alternative forms of advertisement that may be relied up to further promote brand recognition and other promote other advertising. However, as is discussed below, each of these forms of advertisement has their limitations.

Using the Internet, a content data provider can maintain a website whereby users can directly download and view advertising materials on their personal computer. However, one disadvantage of advertising on the Internet is that consumers need to know about the existence of the content data provider's website. In this regard, the content data provider needs to advertise its website or rely on search engines to provide the user with the Internet address of the user's company. Furthermore, to access the website the consumer needs to take an affirmative step and "navigate" to the web site. The term navigate is often referred to as the process of accessing a selected web page on the Internet. Disadvantageously, if the user never navigates to the content data provider's website, the content data provider is never given the opportunity to sell its products.

With respect to direct mail campaigns, many users never open, use, or install promotional CD packages that are sent. Another problem with direct mail campaigns is that due to the lack of ability to obtain feedback, it is difficult to gauge the successfulness of such campaigns.

Problems with billboards include: (i) they can be costly; (ii) there is no guarantee that individuals will see the billboard when driving by; (iii) it is difficult to determine the number of individuals that viewed the advertisement; and (iv) self evidently, there is not an "interactive" experience between the user and the billboard.

Recently, computer manufacturers have begun to assist content data providers in the promotion of their digital content. Before shipping new computers to retailers, many manufacturers bundle their computers with operating systems and the digital content of the content data providers. However, the size of their audience pool in this marketing channel is limited by the number of new computers that are sold. Therefore, without the use of other marketing channels, it is difficult to increase a substantial consumer base.

Thus, personal computer manufacturers are in need of an advertisement and distribution channel that allows them a guarantee that a larger number of consumers can receive their content data.

SUMMARY OF THE INVENTION

One embodiment of the invention comprises a method of displaying content on a display device of a personal computer system connectable to a content delivery server. The personal computer system includes a computing subsystem and a disk drive. The method comprises selecting a network address for the content delivery server and selecting a server-contacting program. The network address and the server-contacting program are stored in the disk drive. Firmware is installed in the disk drive to initiate execution of the server-contacting program after the disk drive is connected to the computing subsystem in the personal computer system. Upon execution, the server-contacting program uses the network address to connect the personal computer system with the content delivery server. The personal computer system is configured to send user information to the content delivery server while the personal computer system is connected to the content delivery server. The method also comprises receiving content from the content delivery server and displaying the content on the display device.

Another embodiment of the invention comprises a personal computer system connectable to a content delivery server having a network address. The personal computer system comprises a display generator, a computing subsystem, and a disk drive that is connectable to the computing subsystem. The disk drive comprises a network address, a server-contacting program, and a disk controller circuit. Upon the occurrence of a selected condition and after the disk drive is connected to the computing subsystem in the personal computer system, the disk controller circuit determines to initiate execution of the server-contacting program.

Upon execution, the server-contacting program uses the network address to connect the personal computer system to the content delivery server.

DETAILED DESCRIPTION OF THE EMBODIMENTS OF THE INVENTION

Figure 1:
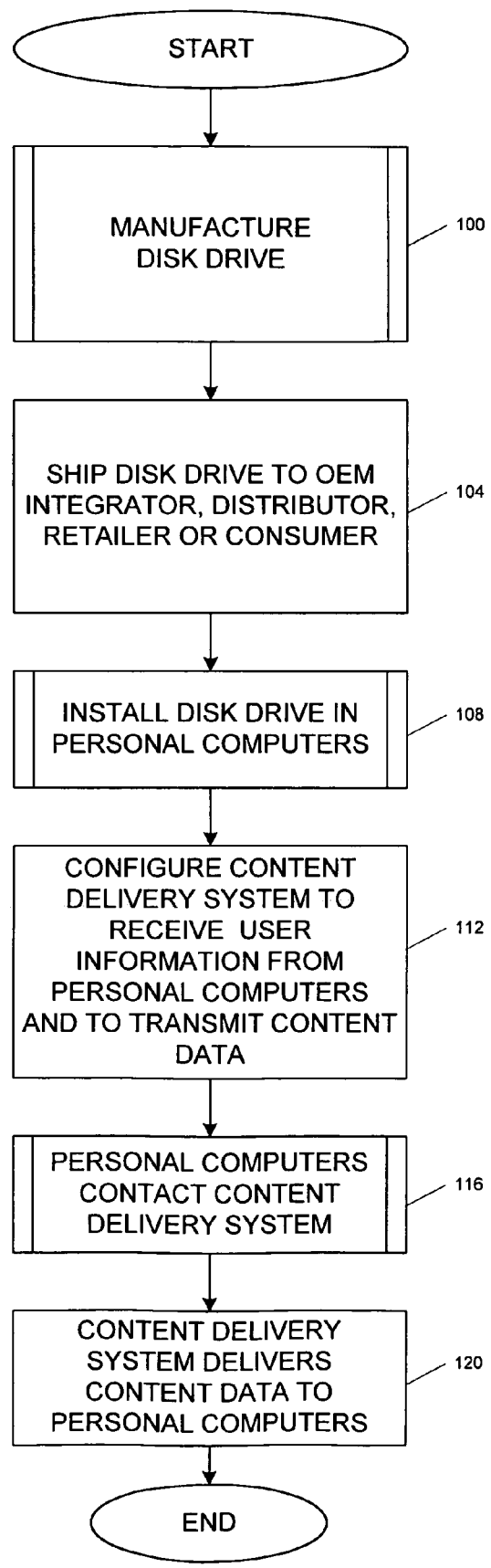
FIG. 1 is a flowchart illustrating one embodiment of a content delivery process according to the present invention.

FIG. 1 is a flowchart illustrating one embodiment of a content delivery process. Alternatively, selected steps of the flowchart may be omitted and others may be added. Furthermore, depending on the embodiment, the ordering of the steps may be varied.

Figure 5:
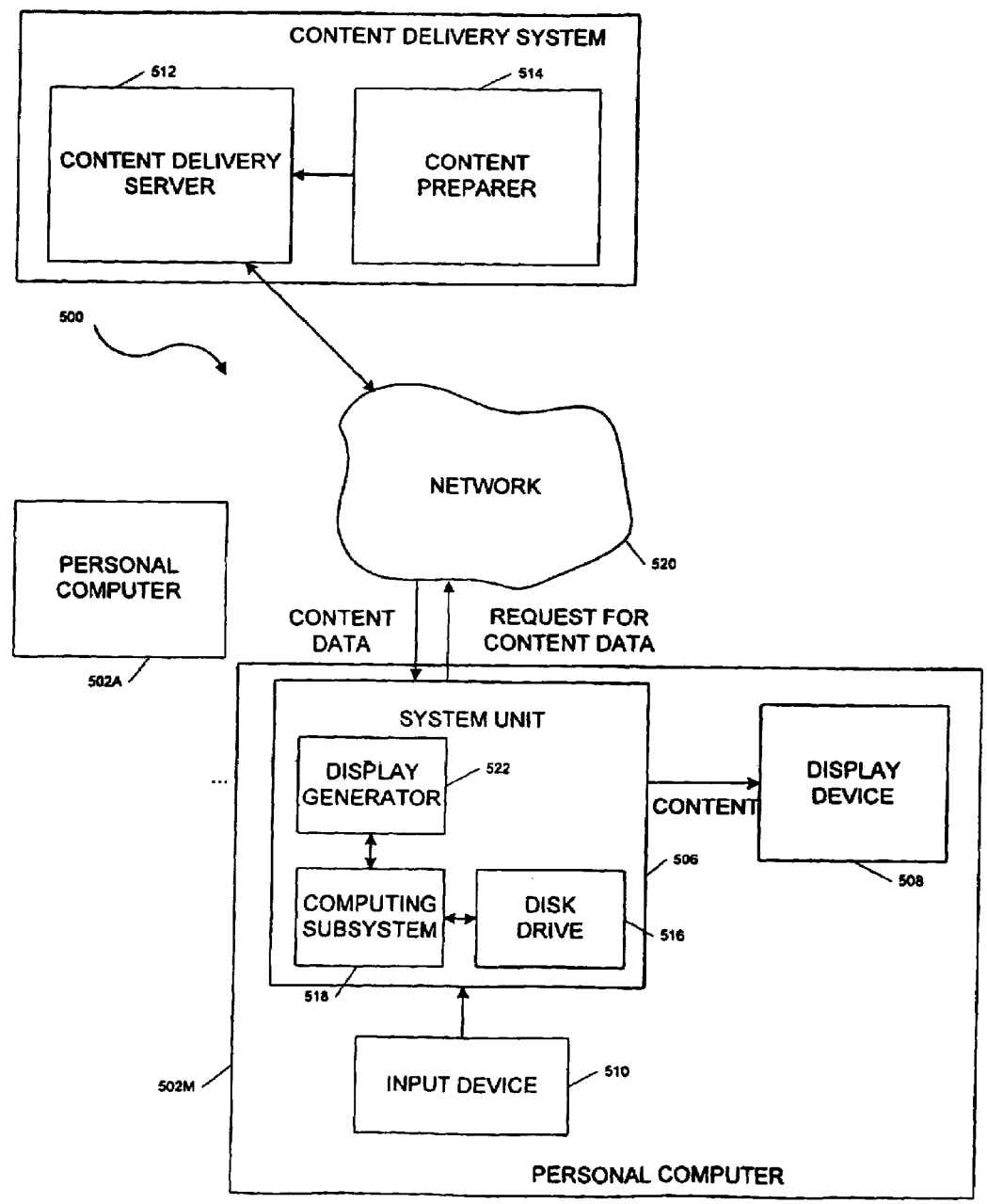
FIG. 5 is a block diagram illustrating a network for distributing content data using the disk drive that is manufactured by the process of FIG. 2.

Starting at a step 100, a manufacturer manufactures a number of disk drives 516 (FIG. 5). The process of manufacturing the disk drives 516 is described in further detail below with respect to FIG. 2. However, in summary with respect to one embodiment of the manufacturing process, a first operating system 604, a server contacting program 608 and a network address 612 are stored in a protected area 628 in the disk drives 516 (all shown in FIG. 6). As is discussed further below, the network address 612 is a link or pointer to a server in the network. In one embodiment of the invention, the network address 612 is either a domain name, an URL, or an IP address. Furthermore, as part of the manufacturing process, firmware 616 on the disk drives 516 is adapted to detect when the disk drives 516 are connected in a personal computer system and to initiate the loading of the first operating system 604. Upon being loaded, the first operating system 604, or an installation program executing under the first operating system, installs the server-contacting program 608 on the personal computer system for use with a second operating system 620.

For convenience of description, the following text will refer to a single disk drive 516. However, it is to be appreciated that the same process may be performed with respect to manufacturing and using any number of disk drives. Furthermore, the disk drive 516 may be integrated with one of several personal computers 502A–502M (FIG. 5). A personal computer may take the form of a laptop, desktop, palmtop, or other configuration suitable for a single user. Although the disk drive 516 may be integrated with any of the personal computers 502A–502M, for convenience of description, the following text assumes that the disk drive 516 will eventually be integrated with the personal computer 502M.

Referring again to FIG. 1, at a step 104, the disk drive 516 is shipped to the consumer via one or more distribution channels. The disk drive 516 may be sold to an original equipment manufacturer (OEM) integrator, a distributor, a retailer, or directly to a consumer. Before sale to the consumer, the OEM integrator, the distributor and the retailer, may load a second operating system 620 and one or more application programs 624 on the disk drive 516. The second operating system 620 can include, for example: UNIX, LINUX, OS/2, PalmOS, Windows 98, Windows NT, and Windows CE. Since the first operating system 604 provides limited functionality, the second operating system 620 may be needed by the consumer to run the consumer's application programs.

Continuing to a step 108, the disk drive 516 is installed in the personal computer 502M. At the step 108, the disk drive 516 is physically connected to an adapter connector that is associated with a computing subsystem 518 (FIG. 5) of the personal computer 502M. The second operating system 620 is then configured for operation with the disk drive 512. Furthermore, as will be described in further detail below with respect to FIG. 3, upon the occurrence of one or more selected conditions, the disk drive 516 initiates the execution of the first operating system 604 which then installs the server contacting program 608 for operation with the second operating system 620. During the installation of the server-contacting program 608, the user may be requested to provide user information, such as a name, an address, demographic information, and billing information.

Proceeding to a step 112, a content delivery server 512 is configured to receive user information, if the user agrees, from the personal computer 502M and to transmit content data to the personal computer 502M once the disk drive 516 is installed (described above with respect to step 108). At this step, the content delivery server 512 is connected to a network 520. The network address 612 in the disk drive 516 identifies the content delivery server.

Next, at step 116, the server contacting program 608 contacts the content delivery server 512. Furthermore, at the step 116, the content delivery server 512 stores the provided user information.

Moving to a step 120, the content delivery server 512 delivers content data to the personal computer 502M. The type of content data can vary greatly depending on the embodiment. Content data may include any type of digital file. For example, the content data can include: a content display program, a game, an entertainment program, a utility program, a product support program, entertainment data, advertisement data, music data, pictures or a movie. Furthermore, as non-limiting examples, the content data can be in any one of the following data formats: DHTML, .AVI, MPEG, QuickTime, a template, a static file, a Joint Photographic Experts Group (JPEG) file, an animated GIF, a Hypertext Markup Layout page, a .wav file, or a Macromedia flash file.

In one embodiment of the invention, the content data is displayed to the user during the boot process of the personal computer 502M. As defined herein, a boot process includes executing one or more programs to configure a personal computer to a state wherein the personal computer can execute an application program specified by the user after booting. In another embodiment of the invention, the content data is displayed to the user during a shutdown phase of the personal computer 502M. In yet another embodiment of the invention, the content data is displayed to the user during periods of low activity on the personal computer 502M.

Preferably, the personal computer 502M monitors the number of times that ads are displayed during boot and reports this number to a reporting server, e.g., the content delivery server. Advantageously, content data providers can accurately determine the number of times that the advertisements are viewed by the consumer.

Figure 2:
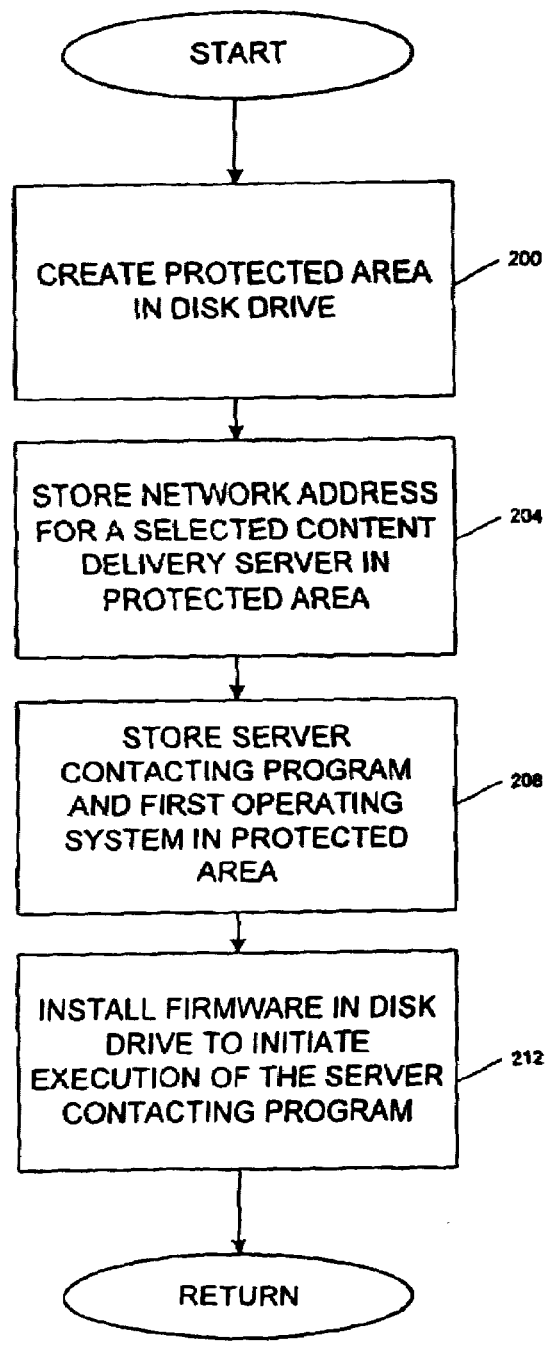
FIG. 2 is a flowchart illustrating in further detail one embodiment of a manufacturing process that is shown in FIG. 1, wherein the manufacturing process manufactures a disk drive.

FIG. 2 illustrates in further detail certain steps that occur in step 100 of FIG. 1. It is to be appreciated that depending on the embodiment, selected steps of the flowchart may be omitted and that others may be added. Furthermore, depending on the embodiment, the ordering of the steps may be varied.

Starting at a step 200, a protected area 628 (FIG. 6) is created on the disk drive 516. In one embodiment, the protected area 628 is written to and read from using proprietary commands that are provided by the manufacturer of the disk drive 516.

Next, at a step 204, the network address 612 for the content delivery server 512 is stored in the protected area 628. The network address 612 can include any type of identifier for an accessible device or content data in a network. Depending on the embodiment, more than one network address may be stored in the protected area 628.

Continuing to a step 208, the first operating system 604 and the server-contacting program 608 are stored in the protected area 628. Advantageously, since the first operating system 604, the server contacting program 608, and the network address 612 are stored in the protected area 628 in the disk drive 516, they cannot be easily deleted from the disk drive 516 by subsequent integration in the personal computer, if at all. The first operating system 604 can be any off-the-shelf or proprietary operating system. As non-limiting examples, the first operating system 604 can be any one of the following operating systems, for example: UNIX, LINUX, and Disk Operating System (DOS).

Moving to a step 212, firmware 616 is installed in the disk drive 516. Firmware 616 is generally microprocessor executable code which is stored in the disk drive in non-volatile memory and executed by a disk drive microprocessor (not shown). In one embodiment of the invention, the firmware 616 resides in a disk controller circuit 632. Disk controller circuit 632 comprises a microprocessor (not shown) suitable for executing firmware code 616. Under certain conditions, the firmware 616 is adapted to initiate execution of the first operating system 604 instead of the second operating system 620. In this regard, in one embodiment, of the invention, the firmware 616 is adapted to recognize when the computing subsystem 518 has requested a boot sector address stored on the disk drive 516. The boot sector governs the behavior of the overall system during boot when control passes from POST Basic Input Output Services (BIOS) code. If the selected conditions, described below, are met and if the computing subsystem 518 has requested the boot sector address that is associated with the second operating system 620, the firmware 616 substitutes a boot sector associated with the first operating system 604 for the requested sector. An exemplary is more fully described in U.S. application Ser. No. 09/507,121 titled "Disk Drive for Selectively Satisfying a Read Request From a Host Computer For A First Valid Data Block With A Second Valid Data Block", filed on Feb. 17, 2000 and which is incorporated by reference herein in its entirety. In another embodiment, the firmware 616 may read the boot sector requested by the BIOS from disk and modify the code prior to transmitting the sector to the host computer system. The code modification may be accomplished by modifying data read from the sector using an algorithm or by "patching" the boot sector data with data stored elsewhere on the disk or embedded in the firmware code. In another embodiment, the firmware 616 may bypass reading the boot sector from the disk and substitute an entire sector stored in non-volatile memory or otherwise embedded in the firmware code. The process flow then returns to step 104 of FIG. 1 (discussed above).

Figure 3:
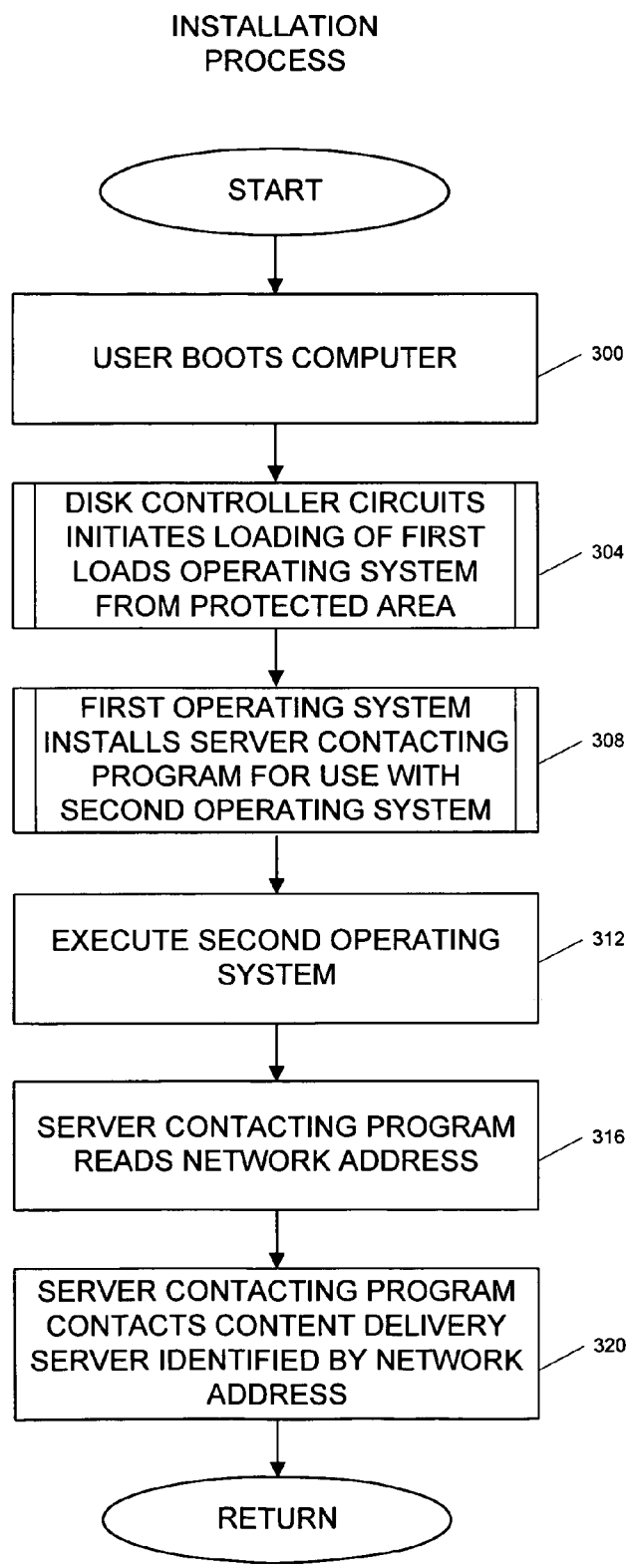
FIG. 3 is a flowchart illustrating in further detail an one embodiment of an installation process that is shown in FIG. 1.

FIG. 3 is a flowchart illustrating one embodiment of a process for installing the server-contacting program 608 for operation with the second operating system 620. FIG. 3 illustrates in further detail certain steps that occur in steps 108 and 116 of FIG. 1. It is to be appreciated that depending on the embodiment, selected steps of the flowchart may be omitted and that others may be added. Furthermore, depending on the embodiment, the ordering of the steps may be varied.

Starting at a step 300, the user boots the personal computer 502M. When the system is powered on, a BIOS program is read from a read only memory in the computing subsystem 518. During its execution, the BIOS issues a plurality of read requests to the disk drive 516. As part of the boot process, the BIOS requests the disk drive 516 to provide a predetermined sector, i.e., the boot sector, to begin the process for loading an operating system.

Next, at a step 304, in response to each read request, the firmware 616 determines whether the read request is for the boot sector. During the step 304, the firmware 616 attempts to activate the first operating system 604 at a point in time after the disk drive 516 is installed at the consumer's personal computer 502M. If the process of installing the server-contacting program 608 is initiated prematurely, the first operating system 604 and/or server-contacting program 608 may be overwritten, or alternatively, notice of the presence of the server-contacting program 608 may be disadvantageously disclosed. For example, often after manufacture, OEM integrator install and test application programs on the disk drive 516. If the process of installing the server contacting program 608 is initiated when the disk drive is in the possession of the OEM integrator, the OEM integrator may disadvantageously uninstall the server contacting program 608.

Figure 9:
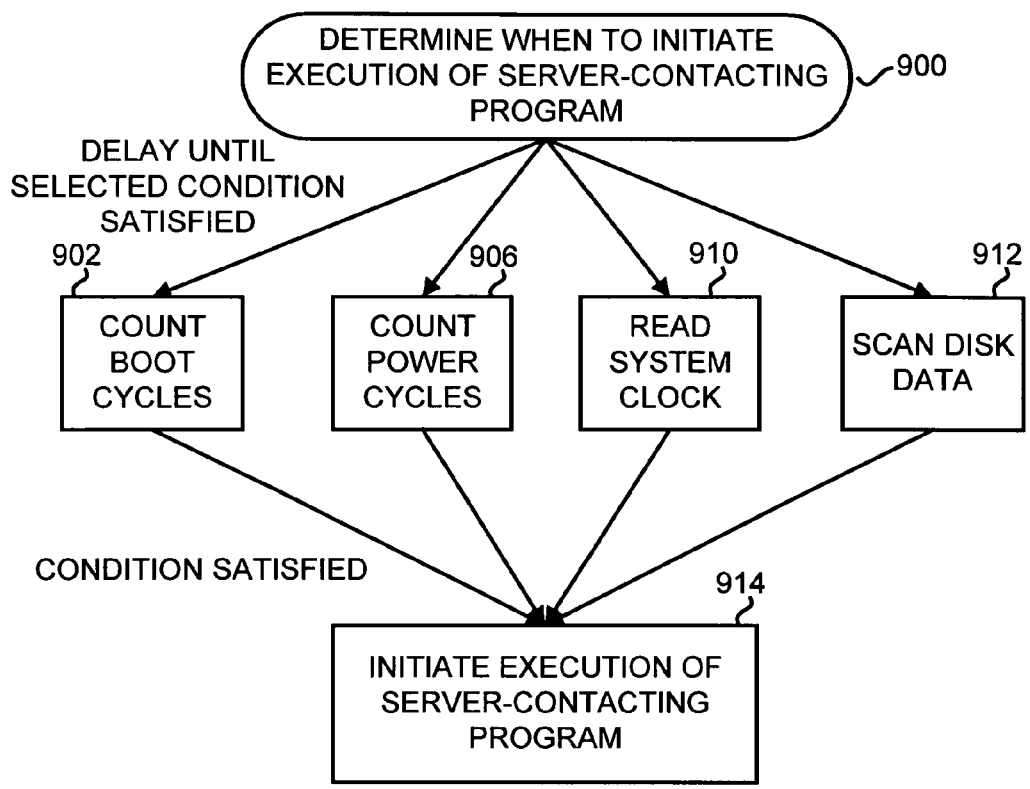
FIG. 9 is a flow chart of a process for delaying initiation of executing a server-contacting program until a selected condition is satisfied.

If the read request is for the boot sector, the firmware 616 determines whether a selected condition has been met and delays initiating execution of the server-contacting program unless the selected conditions are met. As shown in FIG. 9, the process 900 of determining when the selected condition is satisfied can be any one or more of a number of alternatives. The selected conditions can include, among other things, counting 902 a number of bootloads of the computing subsystem 518 or counting 906 until the number of power cycles performed by the disk drive 516 has exceeded a predetermined threshold. If either number exceeds the threshold, it can be assumed by the firmware 616 that the disk drive 516 is in the consumer's possession and is not in the hands of the OEM integrator or other individual that is in the shipping channel of the disk drive 516. This process is further described below with respect to FIG. 7.

Another way of determining when the disk drive 516 has been installed with the personal computer 502M is to adapt the firmware 616 to always initiate execution of the first operating system 604. In one embodiment, a program is loaded by the first operating system 604 which reads (step 910) a system clock from the personal computer 502M. If a sufficient period of time has elapsed, it may be assumed that the disk drive 516 is in use by a consumer.

In another embodiment, firmware 616 may "scan" (step 912) data sectors on the disk to determine whether a bootable system image or operating system has been installed on the disk to determine if the drive has progressed through the channel to a point where the server-contacting program may be initiated. By employing knowledge of conventional assignment of logical block addresses and a comparison of expected to recorded data, the firmware 616 may determine that a suitable operating environment exists for initiating execution of the server-contacting program. In one embodiment, the firmware 616 may comprise an embedded operating system such as Linux. When the selected condition is satisfied, the firmware 616 initiates (step 914) execution of the server-contacting program.

Moving to a step 308, the first operating system 604, or alternatively, an installation program running under the first operating system 604, installs the server-contacting program 608 for use with the user's personal computer 502M. As part of the installation process, the user may, depending on the embodiment, be requested to register to use the server-contacting program 608. In one embodiment of the invention, after being installed, the server contacting program 608 and the network address 612 each reside in the non-protected area of the disk drive 632. After being installed for use with the second operating system 620, the second operating system 620 automatically executes the server-contacting program 608 each time the second operating system 620 is executed.

Next, at a step 312, the second operating system 620 is executed. In one embodiment, to accomplish this step, a soft reboot is issued and during the reboot the firmware 616 initiates the loading of the second operating system 620. The second operating system 620 then executes the server-contacting program 608. In one embodiment of the invention, an exemplary server contacting program 608 is described in U.S. Pat. No. 5,913,040 to Rakavy, et al.

Continuing to a step 316, the server contacting program 608 reads the network address 612 that is stored in the disk drive 516. Moving to a step 320, the server-contacting program 608 uses the network address to contact the content delivery server 512 (the device identified by the network address 612). The process flow then returns step 120 of FIG. 1 (discussed above).

Figure 4:
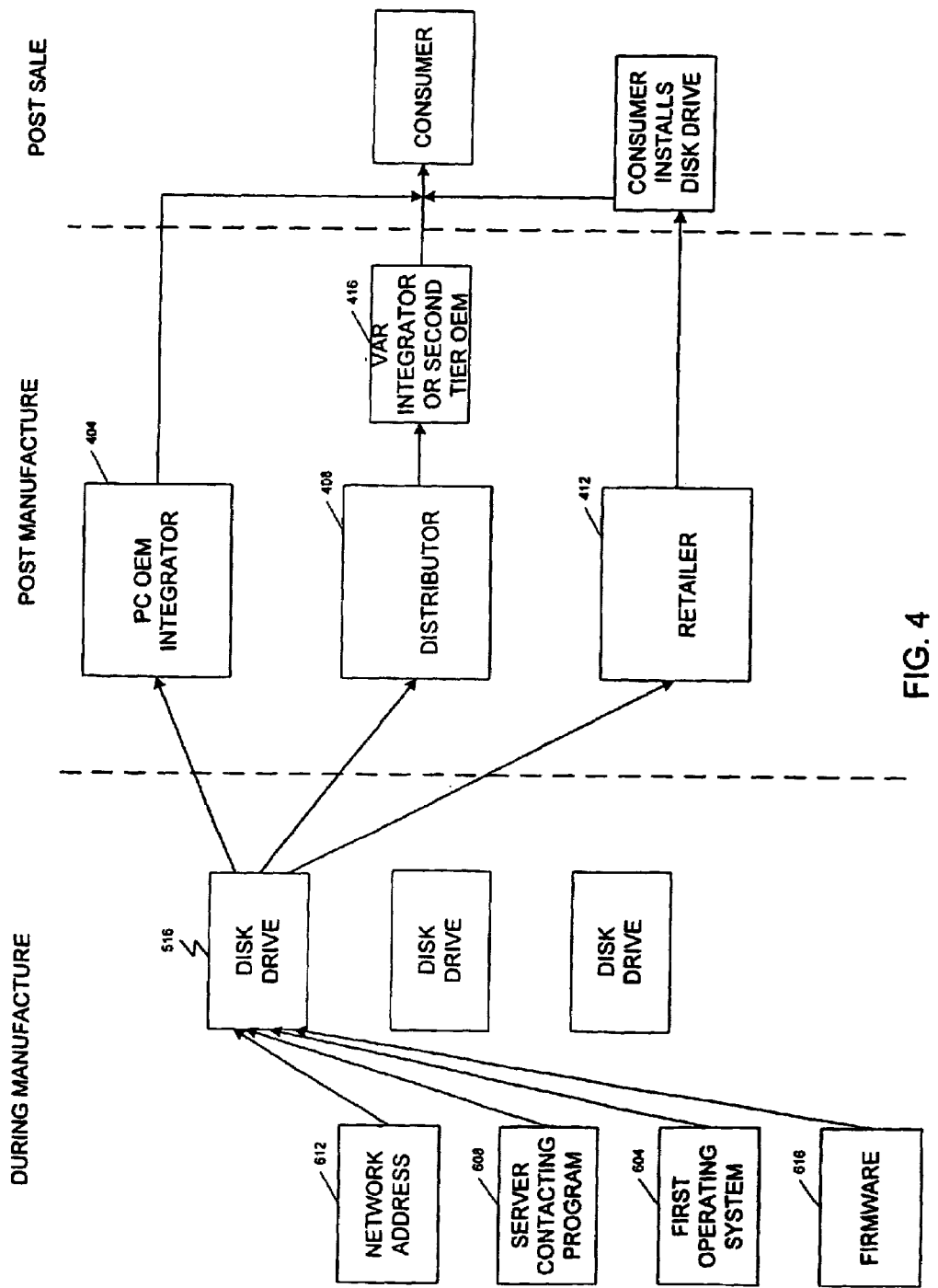
FIG. 4 is a block diagram illustrating certain distribution channels for the disk drive that is manufactured by the process of FIG. 2.

FIG. 4 is a block diagram illustrating certain distribution channels for the disk drive 516. After being manufactured, the disk drive 516 comprises the first operating system 604, the server contacting program 608, and the network address 612. Preferably, a display content engine 610 may be included. Display content engine 610 provides executable code for displaying a variety of digital content such as AVI, JPEG, MPEG, MP3 and other media standards. After manufacture, the disk drive 516 may then be shipped to a PC OEM integrator (block 404), to a distributor (block 408), or to a retailer (block 412). The distributor may further distribute the disk drive 516 to a VAR integrator or a second tier OEM (block 416). The retailer may sell the disk drive 516 to a consumer who installs the disk drive 516 for use with the consumer's personal computer. A process of installing the disk drive 516 is described above with respect to FIG. 3. After installation, the consumer is then able to use the installed disk drive 516.

It is noted that the PC OEM integrator, the distributor, the retailer, the VAR integrator or second tier OEM, or the consumer may install the second operating system 620 and other application programs 624 on the disk drive 516.

FIG. 5 is a block is a block diagram illustrating an exemplary content delivery system 500. The content delivery system comprises a content delivery server 512 that is operably connected to personal computers 502A–502M via a network 520. In one embodiment of the invention, the content delivery server 512 comprises a plurality of geographic servers each having a unique IP address and having a common domain name. The content delivery server 512 is operably connected to a content preprarer 514 which formats content data from the content provider 800 for use by the content delivery server 512. The operation of the content preparer 514 is described below in further detail with respect to FIG. 8.

The personal computers 502A–502M each have a system unit 506, a display device 508, and an input device 510. The system unit 506 comprises a disk drive 516, a computing subsystem 518, and a display generator 522. In one embodiment, the computing subsystem 518 communicates with the disk drive 516 via a disk drive interface. The disk drive interface can be any standard or propriety storage interface. For example, the disk drive interface can be an Intelligent Drive Electronics (IDE) or AT Attachment (ATA) interface.

The computing subsystem 518 may include, among other elements, a processor, random access memory (RAM), read only memory (ROM), a BIOS stored in the ROM, and a system clock. The processor, may be one or more conventional general purpose microprocessors such as a Pentium® processor, a MIPS® processor, a Power PC® processor, or an ALPHA® processor. The network 520 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). As used herein, an Internet includes network variations such as public internet, a private internet, a secure internet, a private network, a public network, a value-added network, an intranet, and the like. The network 520 may include multiple network technologies including both high and low bandwidth connections. The network 520 may include non-persistent connections that are only available at intervals, e.g., dial up telephone lines, and may also include persistent connections.

The input device 510 may be a keyboard, rollerball, pen and stylus, mouse, or voice recognition system. The input device 510 may also be a touch screen associated with the display device 508. The user may respond to prompts on the display by touching the screen. Textual or graphic information may be entered by the user through the input device 510.

Figure 6:
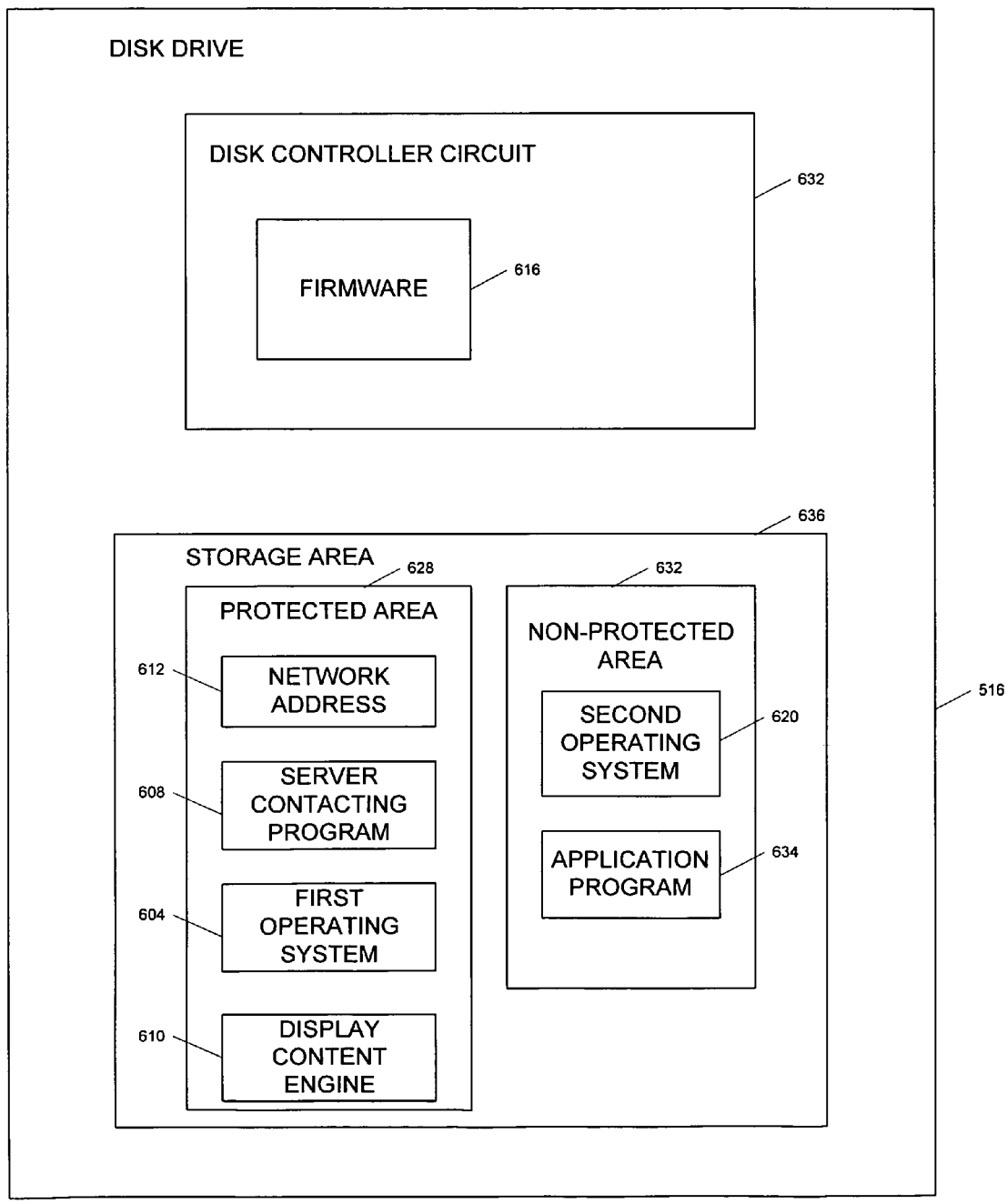
FIG. 6 is a block diagram illustrating certain elements of the disk drive that is manufactured by the process of FIG. 2.

FIG. 6 is a representational block diagram illustrating certain elements of the disk drive 516. The disk drive 516 comprises a disk controller circuit 632 and a storage area 636. The disk controller circuit 632 comprises conventional disk controller components (not shown) such as a read channel device, formatter/controller, host interface logic and buffer controller as well as a microprocessor suitable for executing firmware 616 that is used to initiate the installation of the server contacting program 608 for use with the second operating system 620. Suitably, an ST10 microprocessor from ST microelectronics or an Intel x86 family microprocessor can be used although other equivalent devices or "cores" are available for integration in the disk controller circuitry. It is noted that the process of installing the server-contacting program 608 is described above with respect to FIG. 3.

The storage area 636 comprises a protected area 628 and a non-protected area 632. During manufacture, the first operating system 604, the server-contacting program 608, and the network address 612 are stored in the protected area 628. After manufacture, the second operating system 620 and the application program 624 may be stored by an OEM or the consumer in the non-protected area 632. In one embodiment, the protected area may be implemented by partitioning the disk into two sets of addressable locations—a "protected set" and a "user accessible" set. A "protected" set of addressable locations is addressable only by sending commands or command protocols that are proprietary to the disk drive manufacturer. Data in the protected area may then only be accessed by the firmware or by a host executable program that is entrusted with knowledge of the proprietary commands. The user accessible area is available using standard access methods recognized by the disk drive such as ATA or SCSI standards. In another embodiment, the protected area may be created using standard ATA commands such as SET MAX and READ MAX which allow an area of the drive to be hidden from the host operating system. Other suitable protection may be employed to ensure that the programs in the protected area survive post manufacturing distribution channels.

Figure 7:
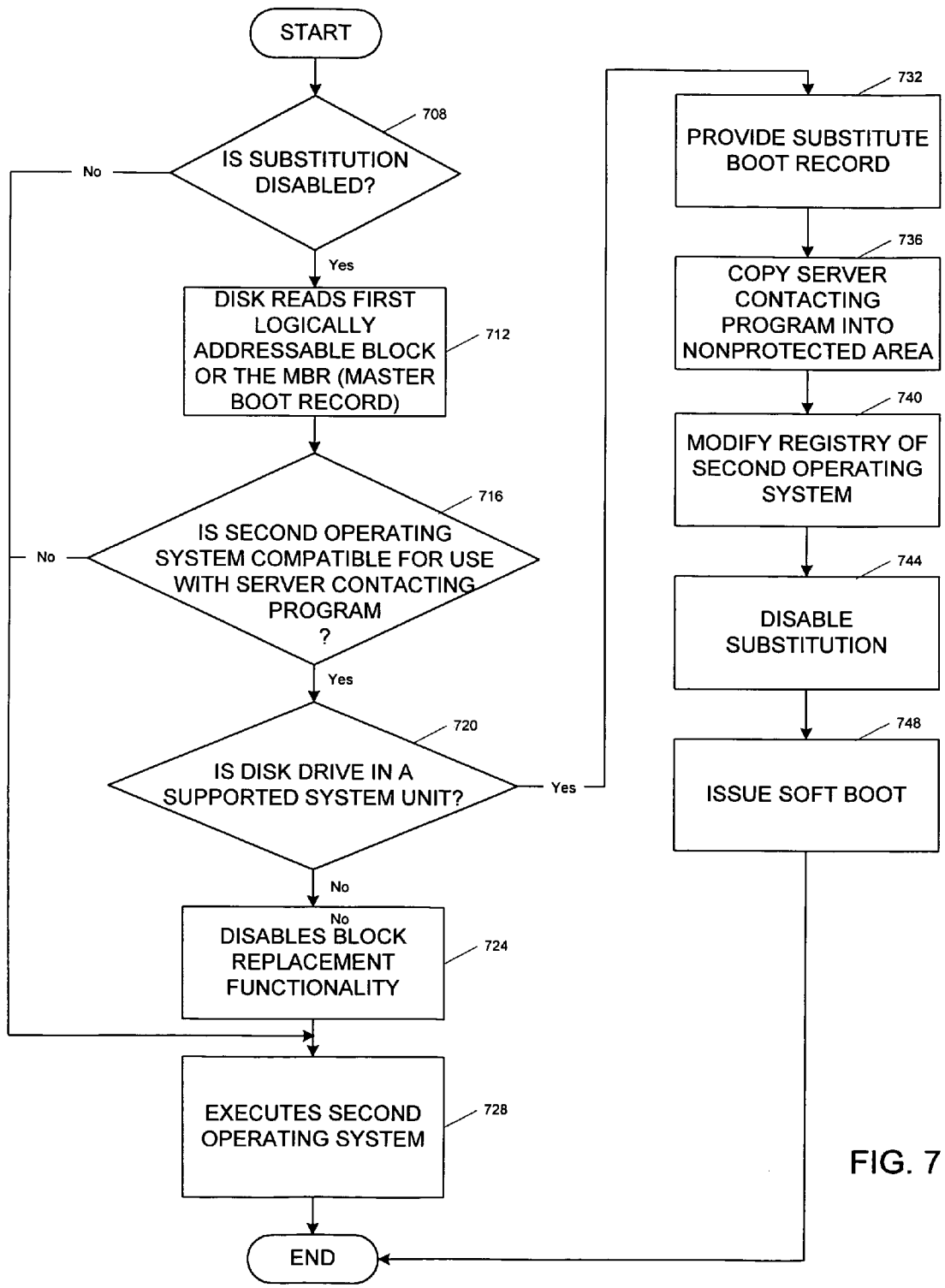
FIG. 7 is a flowchart illustrating in further detail the installation process of FIG. 3.

FIG. 7 is a flowchart illustrating in further detail certain steps of the installation process of FIG. 3. It is to be appreciated that depending on the embodiment, selected steps of the flowchart may be omitted and that others may be added. Furthermore, depending on the embodiment, the ordering of the steps may be varied.

Starting at step 708, upon being accessed, the firmware 616 determines whether operating system substitution is disabled. The process of determining whether the operating system substitution is disabled is described above in further detail with respect to the description of step 304 of FIG. 3, i.e., determining whether the selected conditions have been met. If substitution is disabled, the process flow proceeds to a step 728, wherein the firmware 616 performs the normal boot sequence and initiates the loading of the second operating system 620.

Referring again to step 708, if substitution is not disabled, the process flow proceeds to a step 712, wherein the firmware 606 reads the master boot record (conventionally the first logical block address) that is stored in the disk drive 516.

Next at a step 716, the firmware 616 determines whether the disk drive 516 contains a second operating system 620 that is compatible for use with the server contacting program 608. In one embodiment of the invention, to make this determination, the firmware 616 performs pattern matching of expected sequences in the master boot record. Depending on the embodiment, the boot record may contain: jump instructions to other routines, a version number of the operating system, a boot signature, or a magic number. By matching the values of these fields to expected values that are stored either in the firmware 616 or in the protected area 628, the firmware 616 determines whether the second operating 620 that was installed by the user or other party is supported for use with the server contacting program 608. In such event that the second operating system 620 is unknown and is not compatible for use with the server-contacting program 608, the process proceeds to the step 728.

Referring again to the step 716, if it is determined that the disk drive 516 contains a second operating system 620 that is compatible for use with server contacting program 608, the process proceeds to a step 720, wherein the firmware 616 determines whether the disk drive 516 is in a supported embodiment of system unit 506. At this step, the firmware 616 determines whether the system unit 506 is compatible for use with the first operating system 604 and the server-contacting program 608. In one embodiment of the invention, at this step, the firmware 616 analyzes the BIOS calls to the disk drive 516 to see if sequence corresponds to an expected pattern. If the BIOS calls of the computing system 518 conform to the expected pattern, the firmware 616 assumes that the system unit 506 is compatible for use with the first operating system 604 and the server contacting program 616.

If the disk drive 516 is in a supported embodiment of system unit 506, the process flow proceeds to a step 732 wherein the firmware 616 substitutes the boot record for the first operating system 604 with the boot record of the second operating system 620. This substitution initiates the loading of the first operating system 604.

Next, at a step 736, the first operating system 604, or an installation program executing under the first operating system 604, copies the server contacting program 608 and the network address 612 from the protected area 628 into the non-protected area 632.

Continuing to a step 740, the first operating system 604, or an installation program executing under the first operating system 604, modifies a system registry of the second operating system 620 to include a reference to the server contacting program. The system registry identifies application programs that should be automatically executed by the second operating system 620 after the second operating system 620 is executed.

Proceeding to a step 744, the firmware 616 disables substitution for subsequent booting of the second operating system 620. Next, at a step 748, the first operating system 604, or alternatively, an installation program executing under the first operating system 604, issues a soft boot, thereby initiating the execution of the second operating system 120 and, subsequently, the server contacting program 608.

Figure 8:
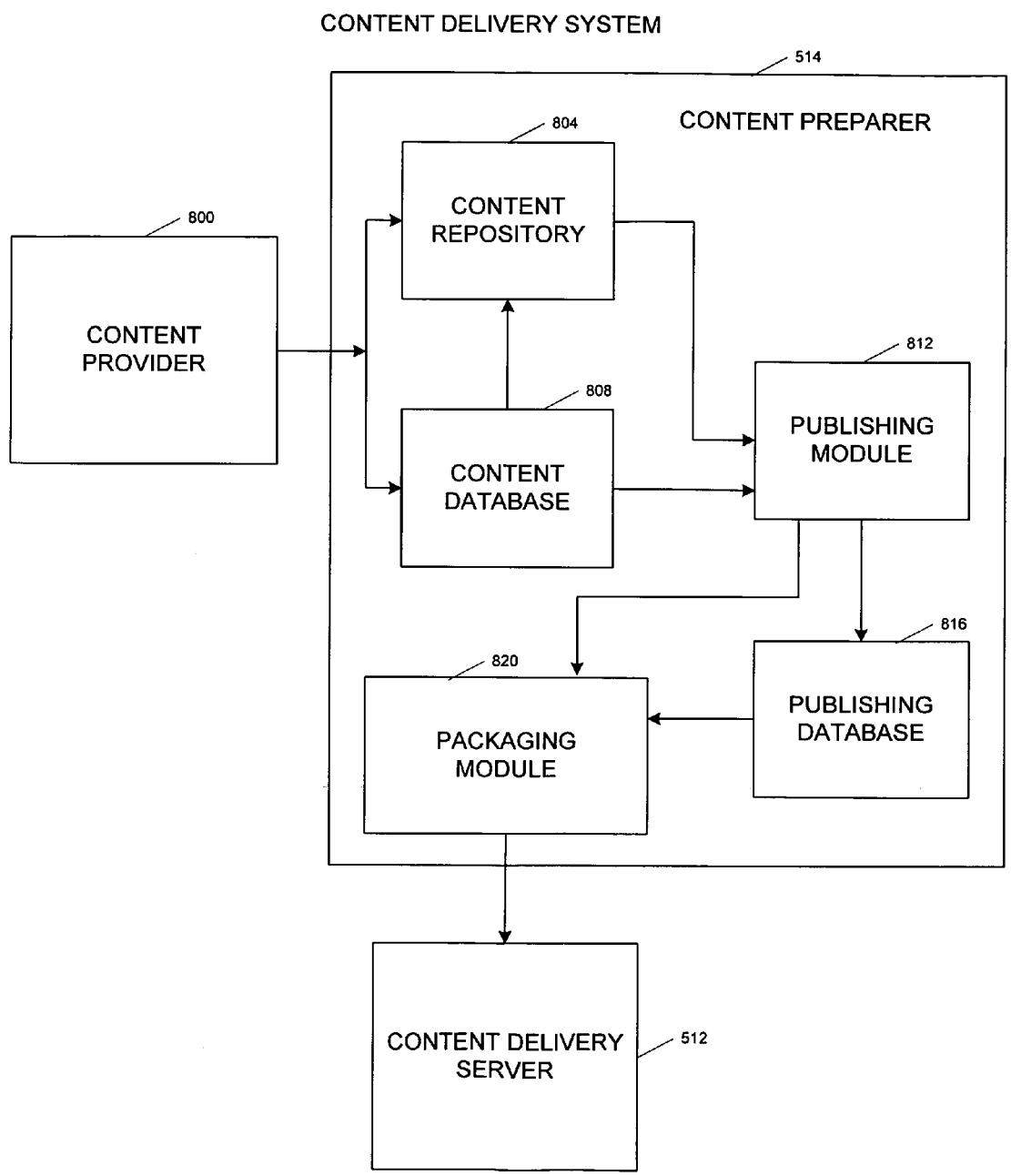
FIG. 8 is a block diagram illustrating certain components of a content preparer.

FIG. 8 is a block diagram illustrating in further detail certain components of one embodiment of the content preparer 514 of FIG. 5. As is shown in FIG. 8, the content preparer 5142 comprises a content repository 804, a content database 808, a publishing module 812, a publishing database 816, and a packaging module 820.

A content provider 800 can submit content data to the content preparer 514 via an on-line submission process that uses a web interface. As part of the submission process, a content provider 800 submits content data and meta-data characterizing the content data to the content preparer 514. The content data is stored in the content repository 804. The meta-data is stored in the content database 808. Periodically, a publishing module 812 extracts the meta-data from the content database 804 and the content from the content repository 804 and formats the material for distribution to the personal computer 502M. The reformatted data content is stored in a publishing database 816. Upon the occurrence of selected conditions, the packaging module 820 accesses the publishing database to determine which materials should be published and delivers the reformatted data content to the personal computer 502M.

Advantageously, the present invention allows disk drive manufacturers to provide content delivery software to users. Since the first operating system 604, the server contacting program 608, and the network address 612 are stored in a protected area 628, these files cannot be easily deleted by other entities in the distribution channels. Furthermore, by including the server-contacting program 608 with each manufactured disk drive 516, the server-contacting program 608 is received by large numbers of personal computer users.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of displaying content on a display device of a personal computer system connectable to a content delivery server, the personal computer system including a computing subsystem and a disk drive, the method comprising:
   selecting a network address for the content delivery server;
   selecting a server-contacting program;
   storing the network address and the server-contacting program in the disk drive;
   installing firmware in the disk drive to initiate execution of the server-contacting program after the disk drive is connected to the computing subsystem in the personal computer system, wherein execution of the server-contacting program includes using the network address for connecting the personal computer system to the content delivery server; and
   configuring the personal computer system to perform:
      sending user information to the content delivery server while the personal computer system is connected to the content delivery server;
      receiving content from the content delivery server; and
      displaying the content on the display device.

2. The method of claim 1, wherein:
   the disk drive includes a protected area; and
   the network address and the server-contacting program are stored in the protected area.

3. The method of claim 1, wherein the firmware comprises a disk controller circuit that automatically initiates execution of the server-contacting program when the disk drive is connected to the computing subsystem in the personal computer system.

4. The method of claim 1, wherein the disk controller circuit delays initiating execution of the server-contacting program until a predetermined period has lapsed.

5. The method of claim 1, wherein the firmware delays initiating execution of the server-contacting program until the firmware determines that a selected number of monitored events exceeds a threshold.

6. The method of claim 5, wherein the monitored events includes the number of boot-ups in the computing subsystem.

7. The method of claim 1, wherein the personal computer system receives content data from the content delivery server and subsequently displays the content during a boot sequence.

8. The method of claim 7, wherein the content of the displayed content data is periodically changed.

9. The method of claim 7, wherein the content data is selected from the group comprising: a content display program, a game, an entertainment program, a utility program, entertainment data, advertisement data, and music data.

10. The method of claim 1, wherein the personal computer system receives content from the content delivery server and subsequently displays the content during a boot sequence.

11. A personal computer system connectable to a content delivery server having a network address, the personal computer system comprising:
    a display generator;
    a computing subsystem; and
    a disk drive connectable to the computing subsystem, the disk drive comprising:
       a network address, and
       a server-contacting program; and
       a disk controller circuit in the disk drive that, upon the occurrence of a selected condition, determines to initiate execution of the server-contacting program after the disk drive is connected to the computing subsystem in the personal computer system, wherein execution of the server-contacting program includes using the network address for connecting the personal computer system to the content delivery server.

12. The personal computer system of claim 11, wherein the computing subsystem is configured to send user information to the content delivery server while the personal computer system is connected to the content delivery server, and receive content from the content delivery server, and wherein the display device displays the content during a selected time interval.

13. The personal computer system of claim 11, wherein the firmware resides in a disk controller circuit.

14. The personal computer system of claim 11, wherein the disk controller circuit delays initiating execution of the server-contacting program until a predetermined period has lapsed.

15. The personal computer system of claim 11, wherein the firmware delays initiating execution of the server-contacting program until the firmware determines that a selected number of monitored events exceeds a threshold.

16. The personal computer system of claim 11, wherein the monitored events includes the number of boot-ups in the computing subsystem.

17. The personal computer system of claim 11, wherein the personal computer system receives content data from the content delivery server and subsequently displays the content during a boot sequence.

18. The personal computer system of claim 17, wherein the content of the displayed content data is periodically changed.

19. The personal computer system of claim 17, wherein the content data is selected from the group comprising: a content display program, a game, an entertainment program, a utility program, entertainment data, advertisement data, and music data.

* * * * *